(12) United States Patent
Talty et al.

(10) Patent No.: US 11,579,294 B2
(45) Date of Patent: Feb. 14, 2023

(54) LIDAR SYSTEM WITH INTEGRATED FREQUENCY SHIFTER FOR TRUE DOPPLER DETECTION

(71) Applicant: GM GLOBAL TECHNOLOGY OPERATIONS LLC, Detroit, MI (US)

(72) Inventors: Timothy J. Talty, Beverly Hills, MI (US); Keyvan Sayyah, Santa Monica, CA (US); Michael Mulqueen, Malibu, CA (US); Richard Kremer, Calabasas, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 762 days.

(21) Appl. No.: 16/554,866

(22) Filed: Aug. 29, 2019

(65) Prior Publication Data

US 2020/0088878 A1    Mar. 19, 2020

Related U.S. Application Data

(60) Provisional application No. 62/731,526, filed on Sep. 14, 2018.

(51) Int. Cl.
| | | |
|---|---|---|
| *G01S 7/00* | (2006.01) | |
| *G01S 17/42* | (2006.01) | |
| *G01S 7/486* | (2020.01) | |
| *G01S 7/48* | (2006.01) | |
| *G01S 7/484* | (2006.01) | |
| *G01S 17/931* | (2020.01) | |

(52) U.S. Cl.
CPC ............ *G01S 17/42* (2013.01); *G01S 7/4802* (2013.01); *G01S 7/484* (2013.01); *G01S 7/486* (2013.01); *G01S 7/4808* (2013.01); *G01S 17/931* (2020.01)

(58) Field of Classification Search
None
See application file for complete search history.

(56) References Cited

U.S. PATENT DOCUMENTS

2019/0391243 A1* 12/2019 Nicolaescu ........... G01S 17/931
2021/0293960 A1*  9/2021 Kreitinger ............ G01S 7/4917

* cited by examiner

*Primary Examiner* — James M McPherson
(74) *Attorney, Agent, or Firm* — Cantor Colburn LLP

(57) ABSTRACT

A vehicle, Lidar system and method of detecting an object is disclosed. The Lidar system includes a photonic chip having a laser, an on-chip frequency shifter, a combiner and a first set of photodetectors. The laser generates a transmitted light beam and an associated local oscillator beam within the photonic chip. The on-chip frequency shifter shifts a frequency of the local oscillator beam. The combiner combines a reflected light beam with the frequency-shifted local oscillator beam, wherein the reflected light beam is a reflection of the transmitted light beam from the object to generate a first electronic signal at the first set of photodetectors. A processor obtains a first measurement of a parameter of the object from the first electronic signal. The vehicle includes a navigation system for navigating the vehicle with respect to the object using at least the first measurement of the parameter.

20 Claims, 8 Drawing Sheets

LIDAR SYSTEM WITH INTEGRATED FREQUENCY SHIFTER FOR TRUE DOPPLER DETECTION

CROSS REFERENCE TO RELATED APPLICATION

This application claims the benefit of U.S. Provisional Application Ser. No. 62/731,526 filed Sep. 14, 2018, the contents of which are incorporated by reference herein in its entirety.

INTRODUCTION

The subject disclosure relates to Lidar systems and their methods of use, and in particular, to a Lidar system including a frequency shifter for removing Doppler ambiguity.

A Lidar system can be used with a vehicle in order to sense objects in the environment of the vehicle, thereby allowing the vehicle or a driver of the vehicle to navigate with respect to the object. The Lidar system obtains various parameters of the object, such as its range, its azimuthal location, its elevation and is velocity, in the form of a Doppler frequency. Often, the Doppler frequency is ambiguous due to movement of the object over a testing frame, acceleration of the object, etc. Accordingly, it is desirable to provide a method for removing this Doppler ambiguity in Lidar systems.

SUMMARY

In one exemplary embodiment, a method of detecting an object is disclosed. The method includes generating, at a laser of a photonic chip, a transmitted light beam and an associated local oscillator beam, shifting a frequency of the associated local oscillator beam via a frequency shifter of the photonic chip to obtain a frequency-shifted local oscillator beam, combining, at a combiner of the photonic chip, a reflected light beam with the frequency-shifted local oscillator beam, the reflected light beam being a reflection of the transmitted light beam from the object, and obtaining a first measurement of a parameter of the object from the combination of the reflected light beam and the frequency-shifted local oscillator beam at a first set of photodetectors.

In addition to one or more of the features described herein, the transmitted light beam and the associated local oscillator beam from a chirp signal. The method further includes shifting the frequency of the associated local oscillator beam by shifting a phase of the chirp signal in a local oscillator waveguide of the photonic chip by a selected amount. The method further includes transmitting the transmitted light beam from the photonic chip via a first aperture and receiving the reflected beam at the photonic chip via a second aperture. The method further includes combining the reflected light beam with an unshifted local oscillator beam and obtaining a second measurement of the parameter of the object from the combination of the reflected light beam with the unshifted local oscillator beam at a second set of photodetectors. The method further includes removing a Doppler ambiguity for the object from a comparison of the first measurement of the parameter of the object and the second measurement of the parameter of the object. The method further includes navigating a vehicle with respect to the object using at least the first measurement of a parameter of the object.

In another exemplary embodiment, a Lidar system is disclosed. The Lidar system includes a photonic chip having a laser, an on-chip frequency shifter, a combiner and a first set of photodetectors. The laser generates a transmitted light beam and an associated local oscillator beam within the photonic chip. The on-chip frequency shifter configured to shift a frequency of the associated local oscillator beam to obtain a frequency-shifted local oscillator beam. The combiner is configured to combine a reflected light beam with the frequency-shifted local oscillator beam, wherein the reflected light beam is a reflection of the transmitted light beam from an object. The first set of photodetectors generates a first electronic signal related to the combination of the frequency-shifted local oscillator beam and the reflected light beam. The Lidar system further includes a processor configured to obtain a first measurement of a parameter from the first electronic signal.

In addition to one or more of the features described herein, the laser is controllable to generate a chirp signal for the transmitted light beam and the associated local oscillator beam. The frequency shifter shifts the frequency of the associated local oscillator beam by shifting a phase of the chirp signal in a local oscillator waveguide by a selected amount. The photonic chip further includes a first aperture by which the transmitted light beam exits the photonic chip and a second aperture of the photonic chip by which the reflected light beam enters the photonic chip. The photonic chip further includes a second set of photodetectors configured to generate a second electronic signal related to a combination of the reflected light beam with an unshifted local oscillator beam. The processor is further configured to remove a Doppler ambiguity for the object from a comparison of the first electronic signal and the second electronic signal. The Lidar system further includes a navigation system configured to navigate a vehicle with respect to the object using at least the first measurement of the parameter of the object.

In yet another exemplary embodiment, a vehicle is disclosed. The vehicle includes a photonic chip, a processor and a navigation system. The photonic chip includes a laser, an on-chip frequency shifter, a combiner and a first set of photodetectors. The laser is configured to generate a transmitted light beam and an associated local oscillator beam within the photonic chip. The on-chip frequency shifter is configured to shift a frequency of the associated local oscillator beam to obtain a frequency-shifted local oscillator beam. The combiner is configured to combine a reflected light beam with the frequency-shifted local oscillator beam, wherein the reflected light beam is a reflection of the transmitted light beam from an object. The first set of photodetectors is configured to generate a first electronic signal related to the combination of the frequency-shifted local oscillator beam and the reflected light beam. The processor is configured to obtain a first measurement of a parameter from the first electronic signal. The navigation system configured to navigate the vehicle with respect to the object using at least the first measurement of the parameter of the object.

In addition to one or more of the features described herein, the laser is controllable to generate a chirp signal for the transmitted light beam and the associated local oscillator beam. The frequency shifter shifts the frequency of the associated local oscillator beam by shifting a phase of the chirp signal in a local oscillator waveguide by a selected amount. The photonic chip further includes a first aperture by which the transmitted light beam exits the photonic chip and a second aperture of the photonic chip by which the reflected light beam enters the photonic chip. The photonic chip further includes a second set of photodetectors is configured to generate a second electronic signal related to a combination of the reflected light beam with an unshifted local oscillator beam. The processor is further configured to remove a Doppler ambiguity for the object from a comparison of the first electronic signal and the second electronic signal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
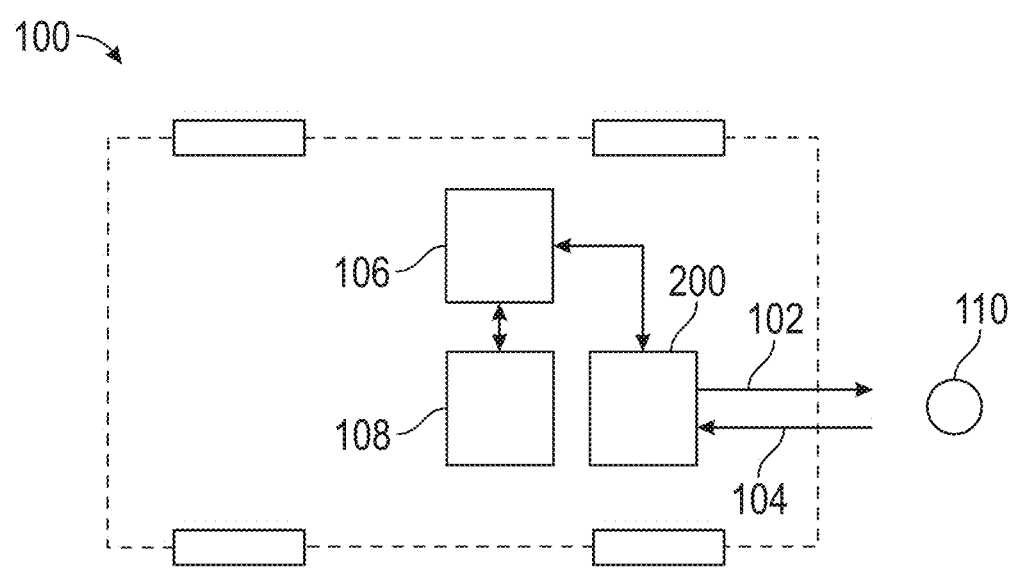
FIG. 1 shows a plan view of a vehicle suitable for use with a Lidar system.

The following description is merely exemplary in nature and is not intended to limit the present disclosure, its application or uses. It should be understood that throughout the drawings, corresponding reference numerals indicate like or corresponding parts and features.

Figure 2:
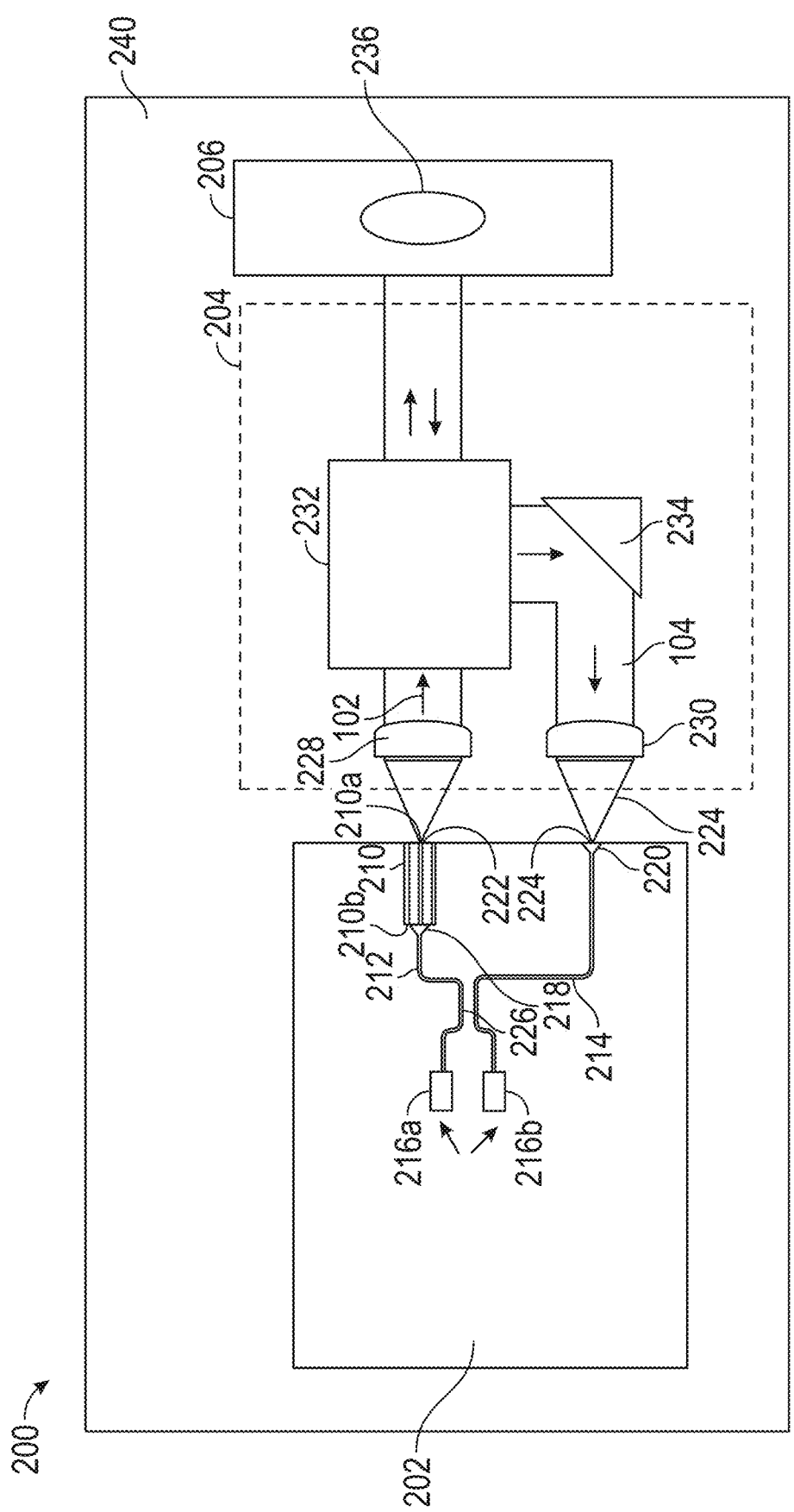
FIG. 2 shows a detailed illustration of an exemplary Lidar system suitable for use with the vehicle of FIG. 1.

In accordance with an exemplary embodiment, FIG. 1 shows a plan view of a vehicle 100 suitable for use with a Lidar system 200 of FIG. 2. The Lidar system 200 generates a transmitted light beam 102 that is transmitted toward an object 110. The object 110 can be any object external to the vehicle 100, such as another vehicle, a pedestrian, a telephone pole, etc. Reflected light beam 104, which is due to interaction of the object 110 and the transmitted light beam 102, is received back at the Lidar system 200. A processor 106 controls various operation of the Lidar system 200 such as controlling a light source of the Lidar system 200, etc. The processor 106 further receives data from the Lidar system 200 related to the differences between the transmitted light beam 102 and the reflected light beam 104 and determines various parameters of the object 110 from this data. The various parameters can include a distance or range of the object 110, azimuth location, elevation, Doppler (velocity) of the object, etc. The vehicle 100 may further include a navigation system 108 that uses these parameters to navigate the vehicle 100 with respect to the object 110 for the purposes of avoiding contact with the object 110. While discussed with respect to vehicle 100, the Lidar system 200 can be used with other devices in various embodiments, including chassis control systems and forward or pre-conditioning vehicle for rough roads.

FIG. 2 shows a detailed illustration of an exemplary Lidar system 200 suitable for use with the vehicle of FIG. 1. The Lidar system 200 includes an integration platform 240, which can be a Silicon platform, and various affixed components. A photonic chip 202, free space optics 204 and a microelectromechanical (MEMS) scanner 206 are disposed on the integration platform 240.

In various embodiments, the photonic chip 202 is part of a scanning frequency modulated continuous wave (FMCW) Lidar. The photonic chip 202 can be a silicon photonic chip in various embodiments. The photonic chip 202 can include a light source, a waveguide and at least one photodetector. In one embodiment, the photonic chip 202 includes a light source, such as a laser 210, a first waveguide 212 (also referred to herein as a local oscillator waveguide), a second waveguide 214 (also referred to herein as a return signal waveguide) and a set of photodetectors 216a and 216b. The photonic chip 202 further includes one or more edge couplers 218, 220 for controlling input of light into associated waveguides. The edge couplers can be spot size converters, gratings or any other suitable device for transitioning light between free space propagation and propagation within a waveguide. At a selected location, the first waveguide 212 and the second waveguide 214 approach each other to form a multi-mode interference (MMI) coupler 226.

The laser 210 is an integrated component of the photonic chip 202. The laser 210 can be any single frequency laser that can be frequency modulated and can generate light at a selected wavelength such as a wavelength that is considered safe to human eyes (e.g., 1550 nanometers (nm)). The laser 210 includes a front facet 210a and a back facet 210b. A majority of the energy from the laser 210 is transmitted into free space via the front facet 210a and a first aperture 222 (transmission aperture) of the photonic chip 202. A relatively small percentage of energy from the laser, also referred to as leakage energy, exits the laser 210 via the back facet 210b and is directed into the first waveguide 212.

The leakage energy used as the local oscillator beam can be varying, therefore affecting measurements related to the parameter of the object 110. In order to control power of the local oscillator beam, a variable attenuator can be used in the optical path of the local oscillator waveguide. When the power of the local oscillator beam exceeds a selected power threshold, the attenuator can be activated to limit the power local oscillator beam. Alternatively, a control voltage can be used at the laser 210 in order to control the gain of the laser 210 at the back facet 210b of the laser. The control voltage can be used to either increase or decrease the radiation or leakage energy at the back facet 210b.

The first waveguide 212 provides an optical path between the back facet 210b of laser 210 and the photodetectors 216a, 216b. An end of the first waveguide 212 is coupled to the back facet 210b of the laser 210 via first edge coupler 218. Leakage energy from the back facet 210b is directed into the first waveguide 212 via the first edge coupler 218.

The second waveguide 214 provides an optical path between a second aperture 224, also referred to as a receiver aperture, of the photonic chip 202 and the photodetectors 216a, 216b. The second edge coupler 220 at the second aperture 224 focuses the incoming reflected light beam 104 into the second waveguide 214.

The first waveguide 212 and second waveguide 214 form a multimode interference (MMI) coupler 226 at a location between their respective apertures (222, 224) and the photodetectors (216a, 216b). Light in the first waveguide 212 and light in the second waveguide 214 interfere with each other at the MMI coupler 226 and the results of the interference are detected at photodetectors 216a and 216b. Measurements at the photodetectors 216a and 216b are provided to the processor 106, FIG. 1, which determines various characteristics of the reflected light beam 104 and thus various parameters of the object 110, FIG. 1. The photodetectors 216a and 216b convert the light signal (i.e., photons) to an electrical signal (i.e., electrons). The electrical signal generally requires additional signal processing such as amplification, conversion from an electrical current signal to an electrical voltage signal, and conversion from an analog signal into a discrete digital signal prior to be provided to the processor 106.

The free space optics 204 includes a collimating lens 228 a focusing lens 230, an optical circulator 232 and a turning mirror 234. The collimating lens 228 changes the curvature of the transmitted light beam 102 from a divergent beam (upon exiting the front facet 210a of laser 210b to a collimated or parallel beam of light. The optical circulator 232 controls a direction of the transmitted light beam 102 and of the reflected light beam 104. The optical circulator 232 directs the transmitted light beam 102 forward without any angular deviation and directs the incoming or reflected light beam 104 by a selected angle. In various embodiments, the selected angle is a 90 degree angle, but any suitable angle can be achieved. The reflected light beam 104 is directed toward the focusing lens 230 at turning mirror 234. The focusing lens 230 changes the curves of the reflected light beam 104 from a substantially parallel beam of light to a converging beam of light. The focusing lens 230 is placed at a distance from second aperture 224 that allows concentration of the reflected light beam 104 onto the second edge coupler 220 at the second aperture 224.

The MEMS scanner 206 includes a mirror 236 for scanning the transmitted light beam 102 over a plurality of angles. In various embodiments, the mirror 236 is able to rotate along two axes, thereby scanning the transmitting light beam 102 over a selected area. In various embodiments, the mirror axes include a fast axis having a scan angle of about 50 degrees and a quasi-static slow axis having a scan angle of about 20 degrees. The MEMS scanner 206 can direct the transmitted light beam in a selected direction and receives a reflected light beam 104 from the selected direction.

Figure 3:
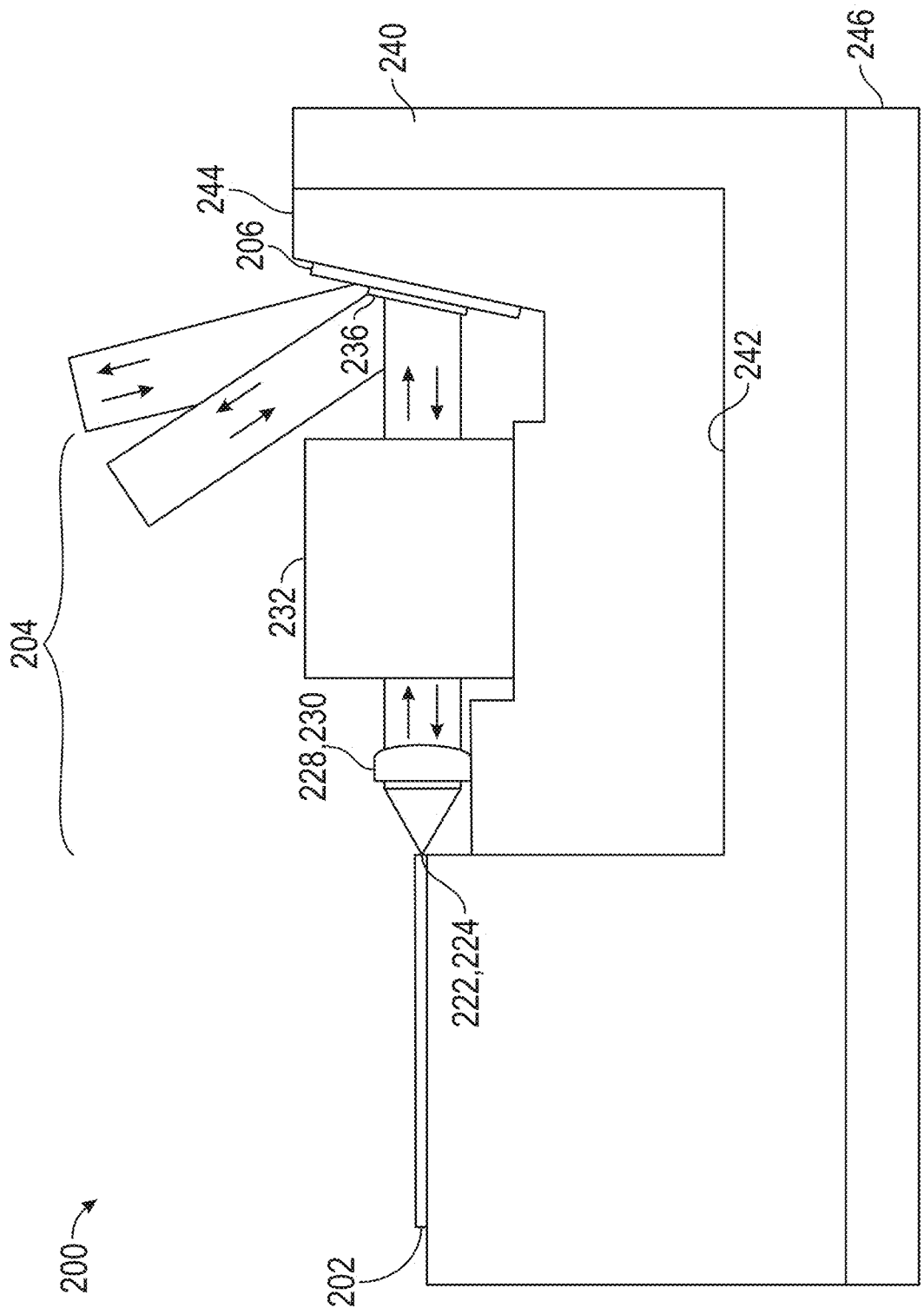
FIG. 3 shows a side view of the Lidar system of FIG. 2.

FIG. 3 shows a side view of the Lidar system 200 of FIG. 2. The integration platform 240 includes the photonic chip 202 disposed on a surface of the integration platform 240. The integration platform 240 includes a pocket 242 into which an optical submount 244 can be disposed. The free space optics 204 and the MEMS scanner 206 can be mounted on the optical submount 244 and the optical submount can be aligned within pocket 242 in order to align the collimating lens 228 with the first aperture 222 of the photonic chip 202 and align the focusing lens 230 with the second aperture 224 of the photonic chip. The optical submount 244 can be made of a material that has a coefficient of thermal expansion that matches or substantially matches the coefficient of thermal expansion of the integration platform 240, in order to maintain the alignment between the free space optics 204 and the photonic chip 202. The integration platform 240 can be coupled to a printed circuit board 246. The printed circuit board 246 includes various electronics for operation of the components of the Lidar system 200, including controlling operation of the laser 210, FIG. 2 of the photonic chip 202, controlling oscillations of the mirror 236, receiving signals from the photodetectors 216a and 216b and processing the signals in order to determine various characteristics of the reflected light beam 104 and thereby determine various parameters of object 110, FIG. 1 associated with the reflected light beam.

The use of an optical submount 244 is one possible implementation for an embodiment of the integration platform 240. In another embodiment, an optical submount 244 is not used and the free space optics 204 and MEMS mirror 236 are disposed directly on the integration platform 240.

Figure 4:
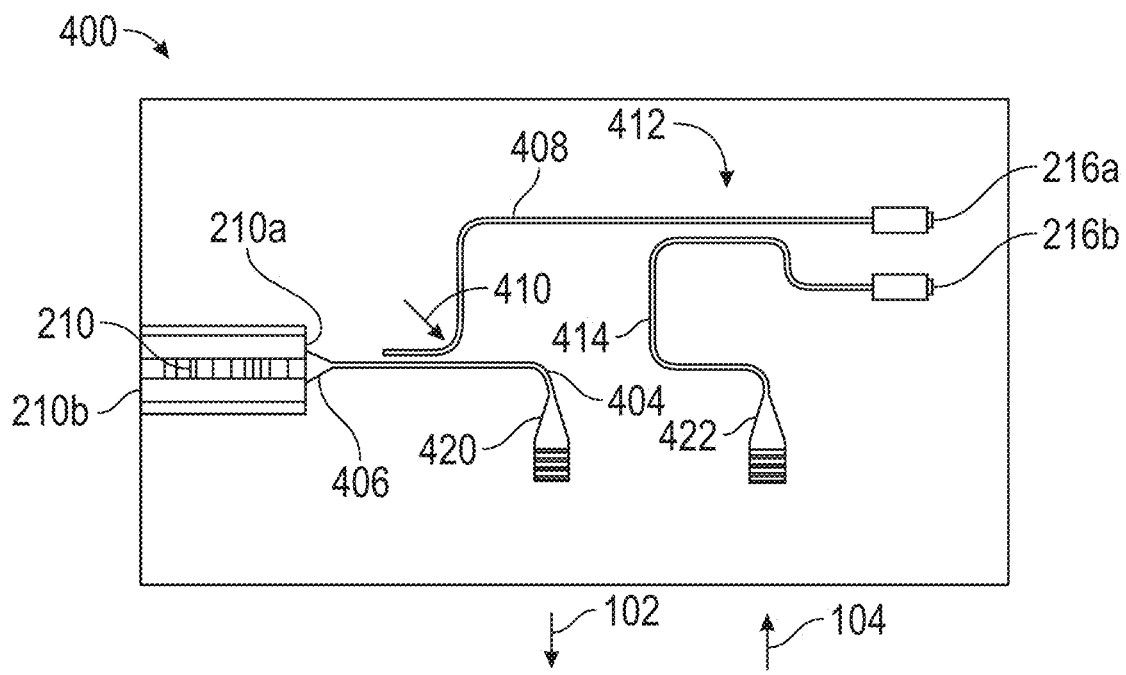
FIG. 4 shows an alternative photonic chip that can be used with the Lidar system in place of the photonic chip of FIG. 2.

FIG. 4 shows an alternative photonic chip 400 that can be used with the Lidar system 200 in place of the photonic chip 202 of FIG. 2. In various embodiments, the photonic chip 400 is part of a scanning frequency modulated continuous wave (FMCW) Lidar and can be a silicon photonic chip. The photonic chip 400 includes a coherent light source such as a laser 210 that is an integrated component of the photonic chip 400. The laser 210 can be any single frequency laser that can be frequency modulated. In various embodiments, the laser 210 generates light at a selected wavelength, such as a wavelength considered safe to human eyes (e.g., 1550 nanometers (nm)). The laser includes a front facet 210a out of which a majority of the laser energy exits from the laser 210 and a back facet 210b out of which a leakage energy exits. The energy which leaks out the back facet 210b can be coupled to a photodetector (not shown) for the purposes of monitoring the performance of the laser 210. The front facet 210a of laser 210 is coupled to a transmitter waveguide 404 via a laser-faced edge coupler 406 that receives the light from the laser 210. The transmitter waveguide 404 directs the light from the front facet 210a of laser 210 out of the photonic chip 400 via a transmission edge coupler 420 as transmitted light beam 102.

A local oscillator (LO) waveguide 408 is optically coupled to the transmitter waveguide 404 via a directional coupler/splitter or a multi-mode interference (MMI) coupler/splitter 410 located between the laser 210 and the transmission edge coupler 420. The directional or MMI coupler/splitter 410 splits the light from the laser 210 into the transmitted light beam 102 that continues to propagate in the transmitter waveguide 404 and a local oscillator beam that propagates in the local oscillator waveguide 408. In various embodiments, a splitting ratio can be 90% for the transmitted light beam 102 and 10% for the local oscillator beam. The power of a local oscillator beam in the local oscillator waveguide 408 can be control by use of a variable attenuator in the LO waveguide 408 or by use of a control voltage at the laser 210. The local oscillator beam is directed toward dual-balanced photodetectors 216a, 216b that perform beam measurements and convert the light signals to electrical signals for processing.

Incoming or reflected light beam 104 enters the photonic chip 400 via receiver waveguide 414 via a receiver edge coupler 422. The receiver waveguide 414 directs the reflected light beam 104 from the receiver edge coupler 422 towards the dual-balanced photodetector 216a, 216b. The receiver waveguide 414 is optically coupled to the local oscillator waveguide 408 at a directional or MMI coupler/ combiner 412 located between the receiver edge coupler 422 and the photodetectors 216a, 216b. The local oscillator beam and the reflected light beam 104 interact with each other at the directional or MMI coupler/combiner 412 before being received at the dual-balanced photodetector 216a, 216b. In various embodiments, the transmitter waveguide 404, local oscillator waveguide 408 and receiver waveguide 414 are optical fibers.

Figure 5:
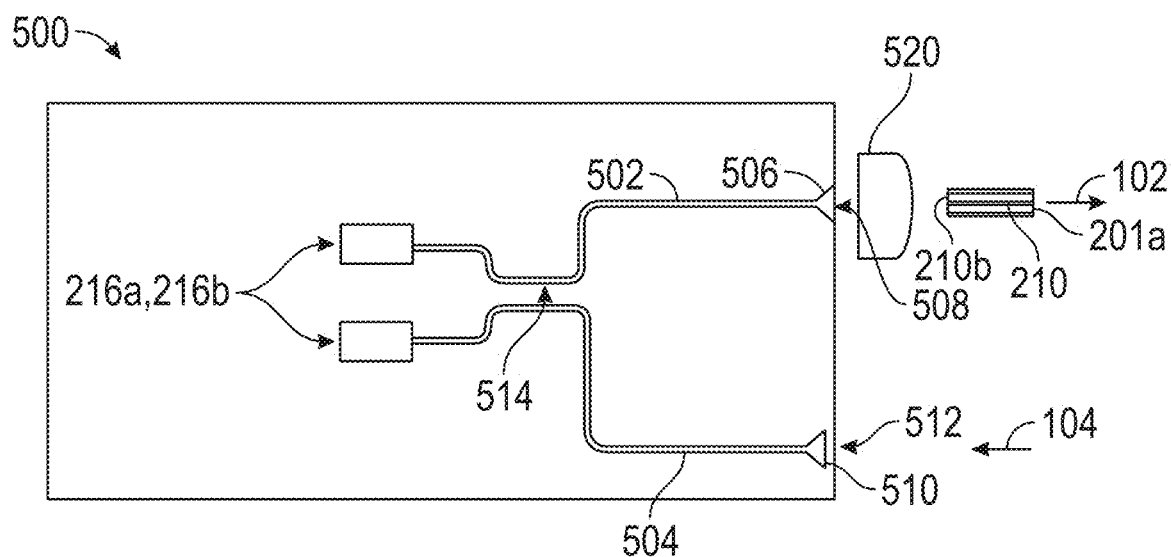
FIG. 5 shows another alternative photonic chip that can be used in place of the photonic chip of FIG. 2.

FIG. 5 shows another alternative photonic chip 500 that can be used in place of the photonic chip 202 of FIG. 2. The alternative photonic chip 500 has a design in which the laser 210 is not integrated onto the photonic chip 500. The photonic chip 500 includes a first waveguide 502 for propagation of a local oscillator beam within the photonic chip 500 and a second waveguide 504 for propagation of a reflected light beam 104 within the photonic chip 500. One end of the first waveguide 502 is coupled to a first edge coupler 506 located at a first aperture 508 of the photonic chip 500 and the first waveguide 502 directs the signal towards photodetectors 216a and 216b. One end of the second waveguide 504 is coupled to a second edge coupler 510 located at a second aperture 512 and the second waveguide 504 directs the signal towards photodetectors 216a, 216b. The first waveguide 502 and the second waveguide 504 approach each other at a location between their respective edge couplers 506, 510 and the photodetectors 216a, 216b to form an MMI coupler 514 in which the local oscillator beam and the reflected light beam 104 interfere with each other.

The laser 210 is off-chip (i.e., not integrated into the photonic chip 500) and is oriented with its back facet 210b directed towards the first edge coupler 506. The laser 210 can be any single frequency laser that can be frequency modulated. In various embodiments, the laser 210 generates light at a selected wavelength, such as a wavelength considered safe to human eyes (e.g., 1550 nanometers (nm)). A focusing lens 520 is disposed between the back facet 210b and the first aperture 508 and focuses the leakage beam from the back facet 210b onto the first edge coupler 506 so that the leakage beam enters the first waveguide 502 to serve as the local oscillator beam. The power of a local oscillator beam in the first waveguide 502 can be controlled by use of a variable attenuator in the first waveguide 502 or by use of a control voltage at the laser 210. Light exiting the laser 210 via the front facet 210a is used as the transmitted light beam 102 and is directed over a field of view of free space in order to be reflected off of an object 110, FIG. 1 within the field of view. The reflected light beam 104 is received at the second edge coupler 510 via suitable free space optics (not shown).

Figure 6:
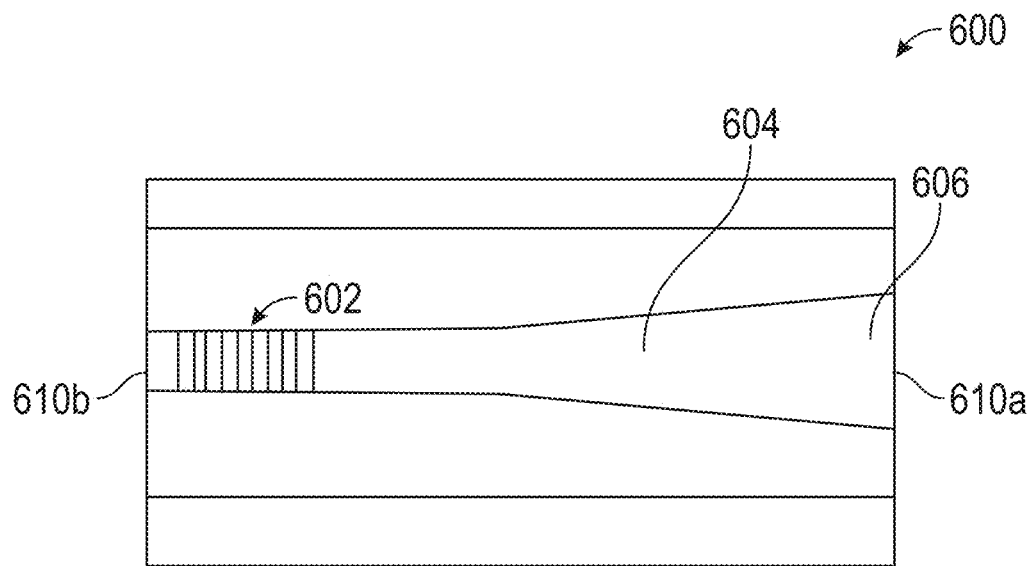
FIG. 6 shows a tapered Distributed Bragg Reflection (DBR) Laser Diode.

FIG. 6 shows a tapered Distributed Bragg Reflection (DBR) Laser Diode 600. The DBR Laser Diode 600 can be used as the laser 210 for the photonic chips 202, 400 and 500 of the Lidar system 200. The DBR Laser Diode 600 includes a highly reflective DBR back mirror 602 at a back facet 610b of the DBR Laser Diode, a less reflective front mirror 606 at a front facet 610a of the DBR Laser Diode and a tapered gain section 604 between the DBR back mirror 602 and the front mirror 606. The DBR back mirror 602 includes alternating regions of materials with different indices of refraction. Current or energy can be applied at the tapered gain section 604 to generate light at a selected wavelength.

Figure 7:
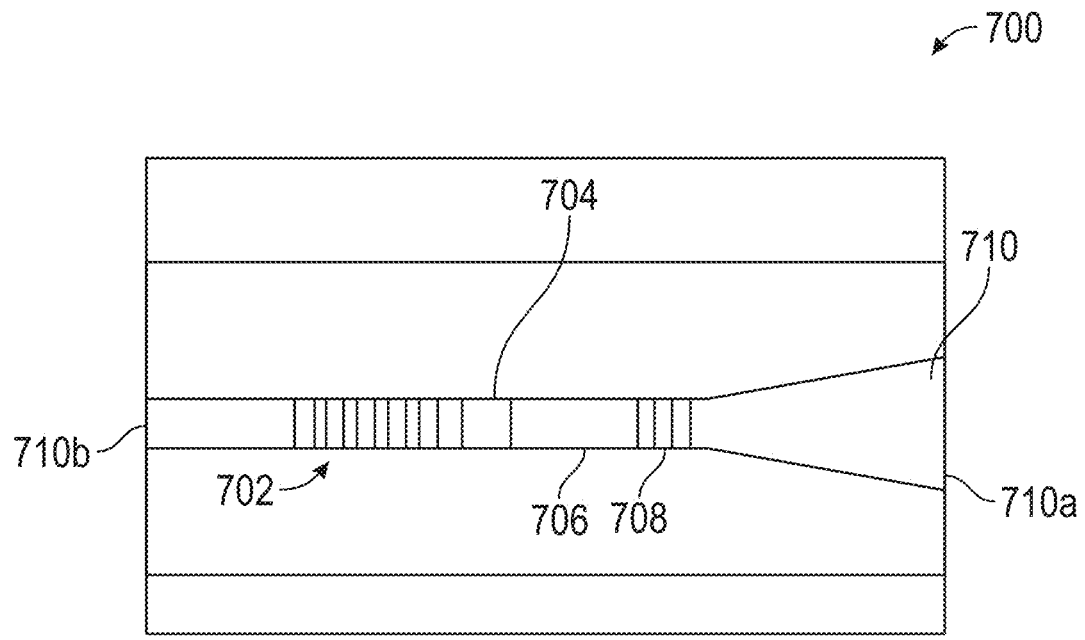
FIG. 7 shows details of a Master Oscillator Power Amplifier (MOPA) in an embodiment.

FIG. 7 shows details of a Master Oscillator Power Amplifier (MOPA) 700 in an embodiment. The MOPA 700 can be used as the laser 210 for the photonic chips 202, 400 and 500 of the Lidar system 200.

The MOPA 700 includes a highly reflective DBR back mirror 702 located at a back facet 710b and a less reflective DBR front mirror 708 near the front facet 710a. A phase section 704 and a gain section 706 are located between the back mirror 702 and the front mirror 708. The phase section 704 adjusts the modes of the laser and the gain section 706 includes a gain medium for generating light at a selected wavelength. The light exiting the front mirror 708 passes through an amplifier section 710 that increases light intensity.

In various embodiments, the laser has a front facet output power of 300 milliWatts (mW) and has a back facet output power of about 3 mW, while maintaining a linewidth of less than about 100 kilohertz (kHz). The MOPA 700, while having a more complicated design than the DBR Laser Diode 600, is often more dependable in producing the required optical power at the front facet while maintaining single-frequency operation and single-spatial mode operation.

Figure 8:
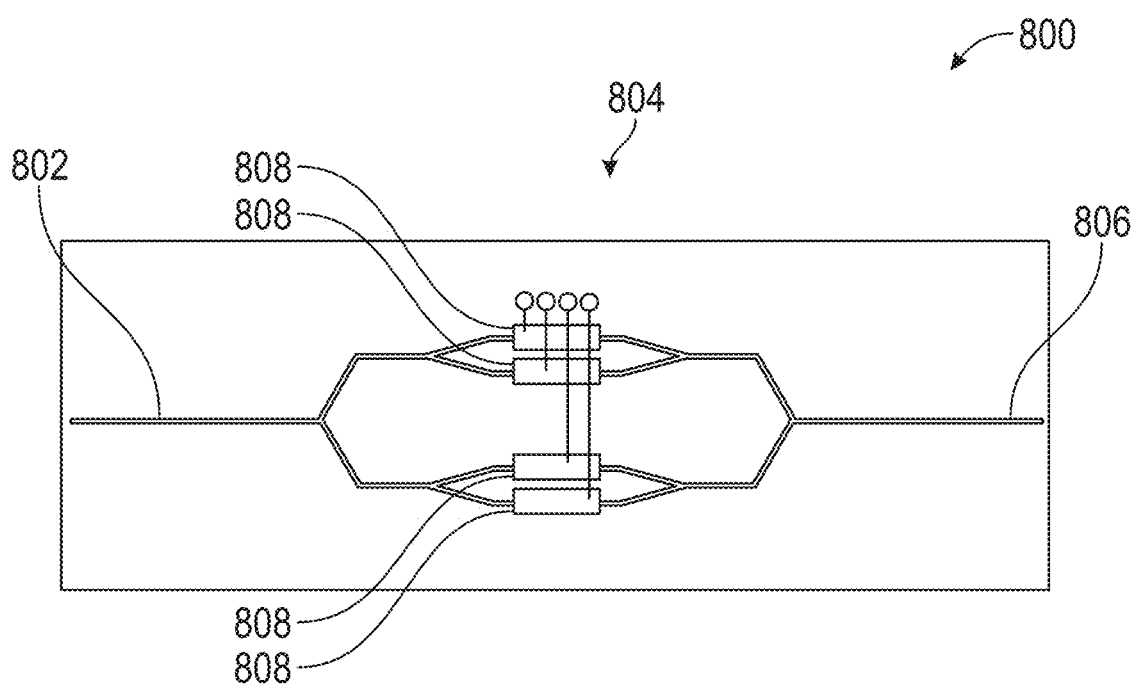
FIG. 8 shows an optical frequency shifter using an Integrated Dual I&Q Mach-Zehnder Modulator (MZM)

FIG. 8 shows an optical frequency shifter 800 using an Integrated Dual I&Q Mach-Zehnder Modulator (MZM) 804. The optical frequency shifter 800 can be used to alter a frequency or wavelength of a local oscillator beam in order to reduce ambiguity in measurements of the reflected light beam 104. The optical frequency shifter 800 includes an input waveguide 802 providing light at a first wavelength/frequency, also referred to herein as a diode wavelength/frequency ($\lambda_D/f_D$), to the MZM 804. The optical frequency shifter 800 further includes an output waveguide 806 that receives light at a shifted wavelength/frequency ($\lambda_D-\lambda_m/f_D+f_m$) from the MZM 804. The $\lambda_m$ and $f_m$ are the wavelength shift and frequency shift, respectively, imparted to the light by the MZM 804.

At the MZM 804, the light from the input waveguide 802 is split into several branches. In various embodiments, there are four branches to the MZM 804. Each branch includes an optical path shifter 808 that can be used to increase or decrease the length of the optical path and hence change the phase delay along the selected branch. A selected optical path shifter 808 can be a heating element that heats the branch in order to increase or decrease the length of the branch due to thermal expansion or contraction. A voltage can be applied to control the optical path shifter 808 and therefore to control the increase of decrease of the length of the optical path. Thus, an operator or processor can control the value of the change in wavelength/frequency ($\lambda_m/f_m$) and thus the shifted wavelength/frequency ($\lambda_D-\lambda_m/f_D+f_m$) in the output waveguide 806.

Figure 9:
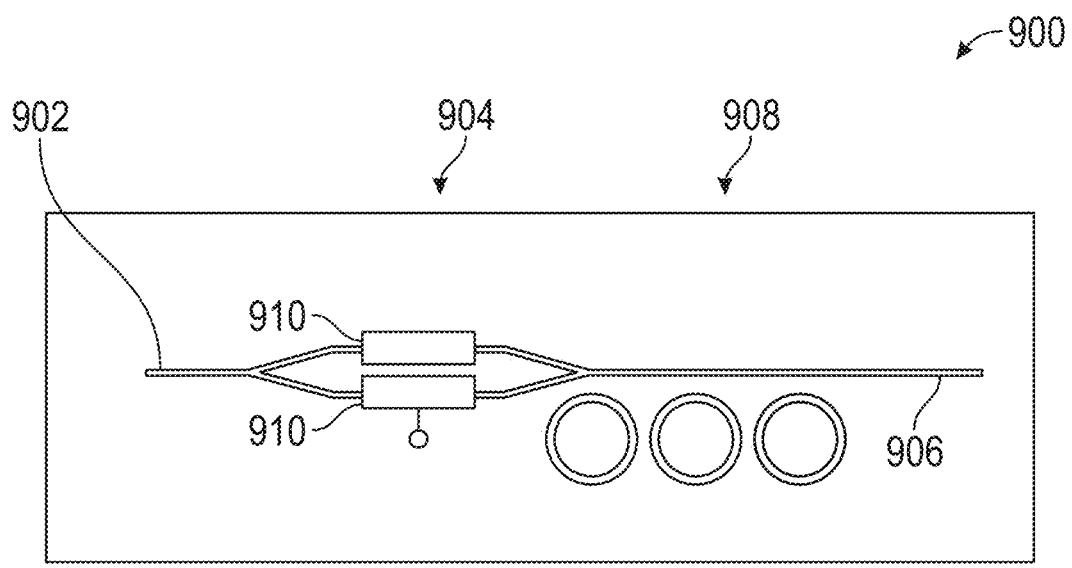
FIG. 9 shows an optical frequency shifter in an alternate embodiment.

FIG. 9 shows an optical frequency shifter 900 in an alternate embodiment. The optical frequency shifter 900 includes a single Mach-Zehnder Modulator (MZM) 904 and a High-Q Ring Resonator Optical Filter 908. The single MZM 904 has two branches of waveguides, each branch having an optical path shifter 910. An input waveguide 902 directs light into the single MZM 904 with an operating wavelength/frequency ($\lambda_D/f_D$), where the light is split among the branches of the single MZM 904. The optical path shifters 910 are activated to impart a change in frequency/wavelength ($\lambda_m/f_m$) to the light. Light from the MZM 904 passes through the optical filter 908 via output waveguide 906 in order to reduce harmonics generated by the single MZM 904. In various embodiments, light exiting via the optical filter 908 has wavelength/frequency ($\lambda_D-\lambda_m/f_D+f_m$).

In various embodiments, the optical frequency shifter (800, 900) shifts the optical frequency of the local oscillator beam by up to about 115 Megahertz (Mhz). The Integrated Dual I&Q MZM 804 is able to achieve a wide range of optical shifting, such as by an amount greater than 1 Gigahertz (GHz) while generating only a low level of harmonics (i.e., <−20 dB). Often, the Integrated Dual I&Q MZM 804 is selected over the Integrated Single MZM and High-Q Ring Resonator Optical Filter 908, although its design is more complex.

Figure 10:
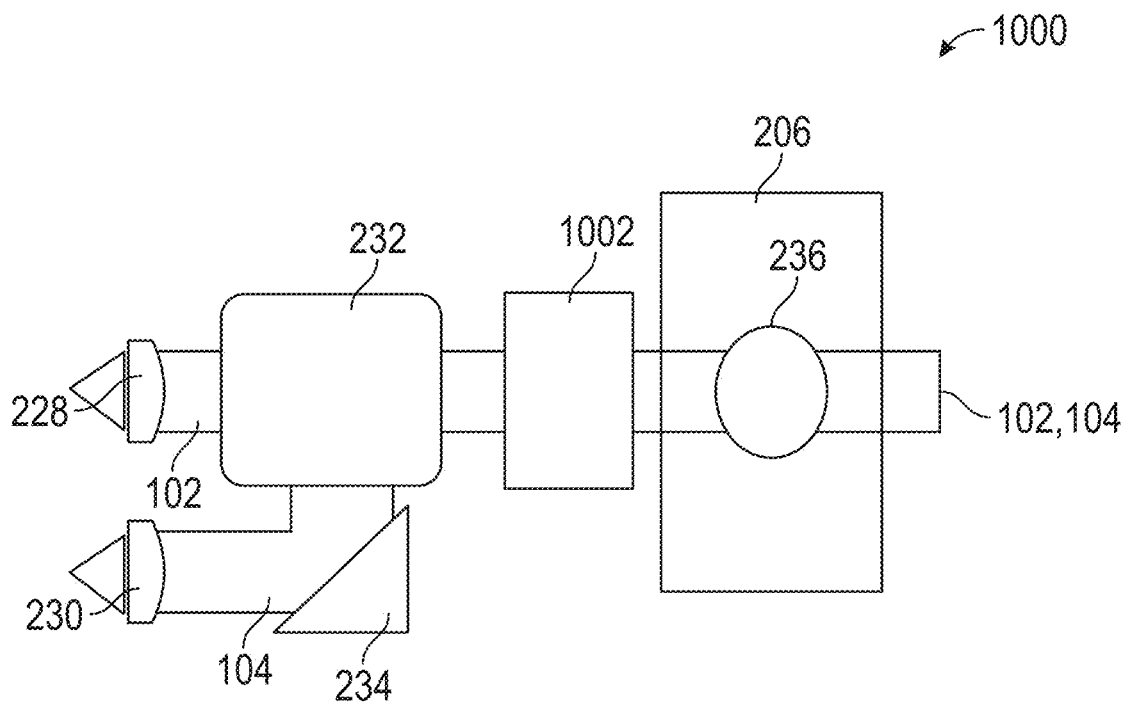
FIG. 10 shows an alternate configuration of free space optics and MEMS scanner for use with the Lidar system of FIG. 2.

FIG. 10 shows an alternate configuration 1000 of free space optics 204 and MEMS scanner 206 for use with the Lidar system 200, FIG. 2. The free space optics includes the collimating lens 228, focusing lens 230, optical circulator 232 and turning mirror 234 as shown in FIG. 2. The free space optics further includes a turning mirror 1002 that directs the transmitted light beam 102 from the optical circulator 232 onto the mirror 236 of the MEMS scanner 206 and directs the reflected light beam 104 from the mirror 236 of the MEMS scanner 206 to the optical circulator 232. The turning mirror can deflect the light out of the plane of the free space optics and can include a plurality of turning mirrors in various embodiments.

Figure 11:
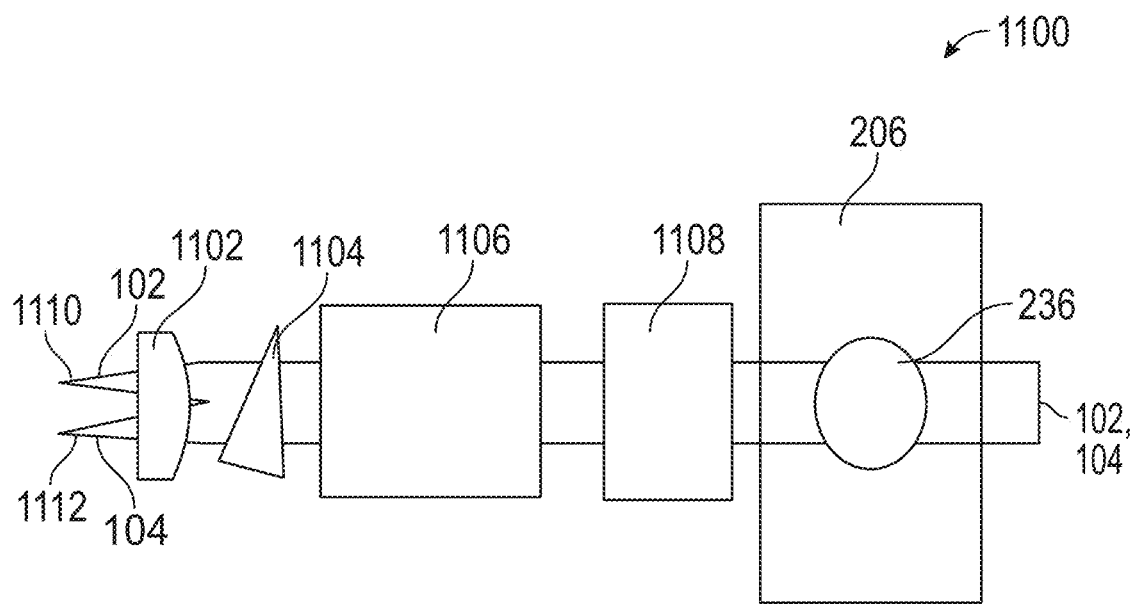
FIG. 11 shows an alternate configuration of free space optics and MEMS scanner for use with the Lidar system of FIG. 2.

FIG. 11 shows an alternate configuration 1100 of free space optics 204 and MEMS scanner 206 for use with the Lidar system 200, FIG. 2. The free space optics includes a single collimating and focusing lens 1102, a birefringent wedge 1104, a Faraday rotator 1106 and a turning mirror 1108. The collimating and focusing lens 1102 collimates the transmitted light beam 102 traveling in one direction and focuses the reflected light beam 104 traveling in the opposite direction. The birefringent wedge 1104 alters a path of a light beam depending on a polarization direction of the light beam. The Faraday rotator 1106 affects the polarization directions of the light beams. Due to the configuration of the birefringent wedge 1104 and the Faraday rotator 1106, the transmitting light beam 102 is incident on the birefringent wedge 1104 with a first polarization direction and the reflected light beam 104 is incident on the birefringent wedge 1104 with a second polarization direction that is different from the first polarization direction, generally by a 90 degree rotation of the first polarization direction. Thus the transmitting light beam 102 can exit the photonic chip at a first aperture 1110 and be deviated to travel along selected direction at mirror 236 of MEMS scanner 206. Meanwhile the reflected light beam 104, travelling in the opposite direction as the transmitted light beam 102 at the MEMS scanner 206, is deviated onto another direction that is directed towards a second aperture 1112 of the photonic chip.

A turning mirror 1108 directs the transmitted light beam 102 from the Faraday rotator 1106 onto the mirror 236 of the MEMS scanner 206 and directs the reflected light beam 104 from the mirror 236 of the MEMS scanner 206 to the Faraday rotator 1106. The turning mirror 1008 can deflect the light out of the plane of the free space optics and can include a plurality of turning mirrors in various embodiments.

Figure 12:
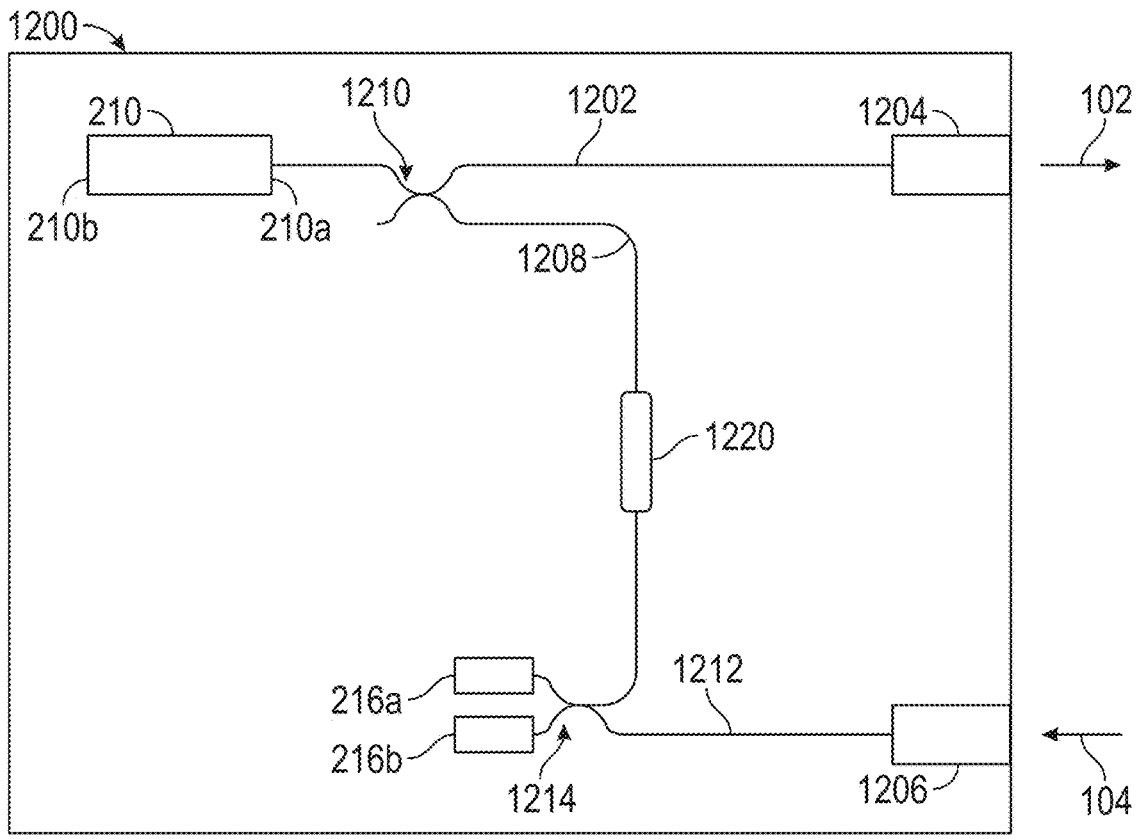
FIG. 12 shows an alternative photonic chip usable with the Lidar system of FIG. 2 to resolve Doppler ambiguity.

FIG. 12 shows an alternative photonic chip 1200 usable with the Lidar system 200 of FIG. 2 to resolve Doppler ambiguity. In various embodiments, the photonic chip 1200 is part of a scanning frequency modulated continuous wave (FMCW) Lidar and can be a silicon photonic chip. The photonic chip 1200 includes a coherent light source such as a laser 210 that is an integrated component of the photonic chip 1200. The laser 210 can be any single frequency laser that can be controlled to generate a linear frequency modulated (LFM) signal, also known as a "chirp" signal. In various embodiments, the laser 210 generates light at a selected wavelength, such as a wavelength considered safe to human eyes (e.g., 1550 nanometers (nm)). The laser includes a front facet 210*a* out of which a majority of the laser energy exits from the laser 210 and a back facet 210*b* out of which a leakage energy exits. The front facet 210*a* of laser 210 is coupled to a transmitter waveguide 1202 via a laser-faced edge coupler (not shown) that receives the light from the laser 210. The transmitter waveguide 1202 directs the light from the front facet 210*a* of laser 210 out of the photonic chip 1200 via first aperture 1204 as transmitted light beam 102. The first aperture 1204 can include an edge coupler such as a grating or a spot size converter (not shown).

A local oscillator (LO) waveguide 1208 is optically coupled to the transmitter waveguide 1202 via a directional coupler/splitter or a multi-mode interference (MMI) coupler/splitter 1210 located between the laser 210 and the first aperture 1204. The directional or MMI coupler/splitter 1210 splits the light from the laser 210 into the transmitted light beam 102 that continues to propagate in the transmitter waveguide 1202 and a local oscillator beam that propagates in the local oscillator waveguide 1208. In various embodiments, a splitting ratio can be 90% for the transmitted light beam 102 and 10% for the local oscillator beam. The power of a local oscillator beam in the local oscillator waveguide 1208 can be controlled by use of a variable attenuator in the LO waveguide 1208 or by use of a control voltage at the laser 210. The local oscillator beam is directed toward dual-balanced photodetectors 216*a*, 216*b* that perform beam measurements and convert the light signals to electrical signals for processing.

Incoming or reflected light beam 104 enters the photonic chip 1200 via a second aperture 1206 and receiver waveguide 1212. The second aperture 1206 can include an edge coupler such as a grating or a spot size converter (not shown). The receiver waveguide 1212 directs the reflected light beam 104 from the second aperture 1206 towards the dual-balanced photodetector 216*a*, 216*b*. The receiver waveguide 1212 is optically coupled to the local oscillator waveguide 1208 at a directional or MMI coupler/combiner 1214 located between the second aperture 1206 and the photodetectors 216*a*, 216*b*. The local oscillator beam and the reflected light beam 104 interact with each other at the directional or MMI coupler/combiner 1214 before being received at the dual-balanced photodetector 216*a*, 216*b*. In various embodiments, the transmitter waveguide 1202, local oscillator waveguide 1208 and receiver waveguide 1212 are optical fibers.

The local oscillator waveguide 1208 includes an optical frequency shifter 1220. The optical frequency shifter 1220 is located between the MMI coupler/splitter 1210 and the MMI coupler/combiner 1214. The optical frequency shifter 1220 shifts the frequency of the local oscillator beam. Since the local oscillator beam is a linear frequency modulated (LFM) signal or "chirp" signal, the frequency shift can be accomplished by changing a phase of the chirp signal. The frequency-shifted signal is then combined with the reflected beam signal at the MMI coupler combine 1214. The result of the combination provides a first measurement of a parameter of the object. In various embodiments, the first measurement has a reduced level of Doppler ambiguity in the signal.

Figure 13:
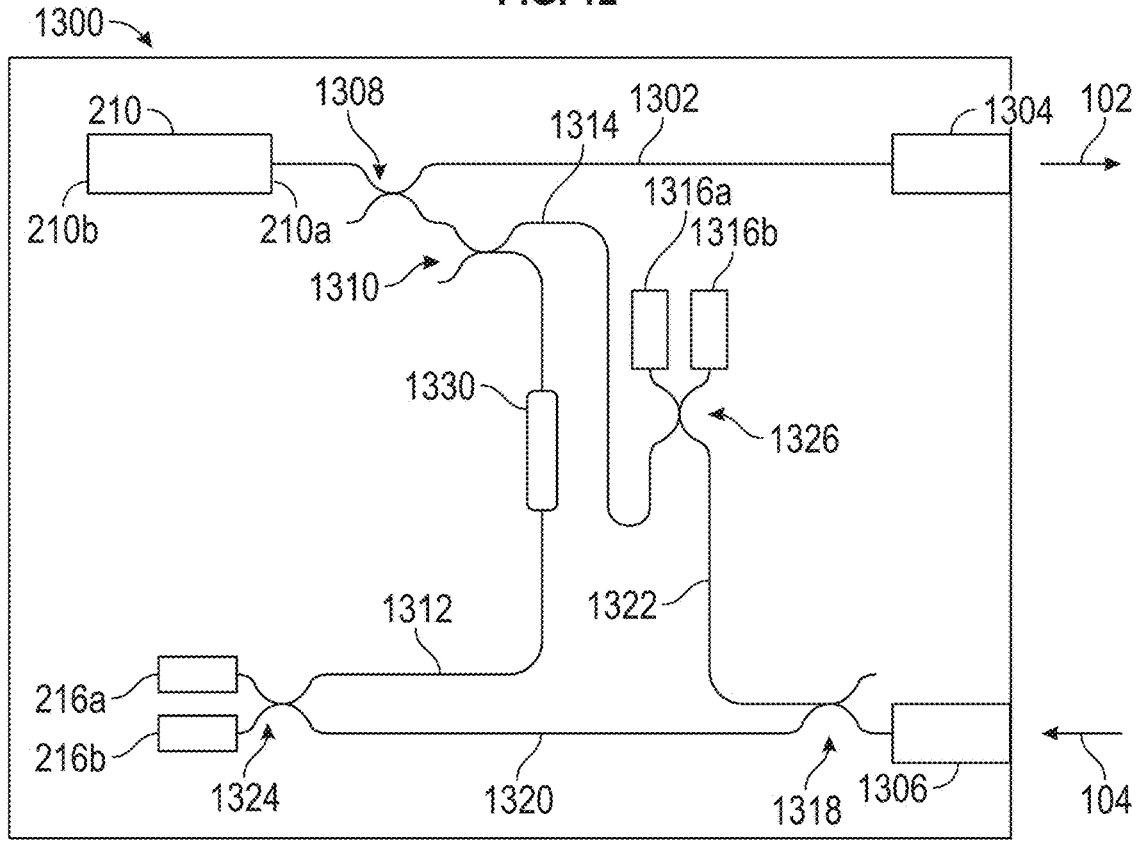
FIG. 13 shows another alternative photonic chip usable with the Lidar system of FIG. 2 to resolve Doppler ambiguity.

FIG. 13 shows another alternative photonic chip 1300 usable with the Lidar system 200 of FIG. 2 to resolve Doppler ambiguity. The photonic chip 1300 includes a coherent light source such as a laser 210 that is an integrated component of the photonic chip 1200. The laser 210 can be any single frequency laser that can be controlled to generate a linear frequency modulated (LFM) signal, also known as a "chirp" signal. In various embodiments, the laser 210 generates light at a selected wavelength, such as a wavelength considered safe to human eyes (e.g., 1550 nanometers (nm)). The laser includes a front facet 210a out of which a majority of the laser energy exits from the laser 210 and a back facet 210b out of which a leakage energy exits. The front facet 210a of laser 210 is coupled to a transmitter waveguide 1302 via a laser-faced edge coupler (not shown) that receives the light from the laser 210. The transmitter waveguide 1302 directs the light from the front facet 210a of laser 210 out of the photonic chip 1300 via first aperture 1304 as transmitted light beam 102. The first aperture 1304 can include an edge coupler such as a grating or a spot size converter (not shown).

A pair of directional couplers/splitters or MMI couplers/splitters 1308 and 1310 extract from the transmitter waveguide 1302 a first local oscillator beam propagating through a first local oscillator waveguide 1312 and a second local oscillator beam propagating through a second local oscillator waveguide 1314. The first local oscillator waveguide 1312 directs the first local oscillator beam toward a first set of dual-balanced photodetectors 216a, 216b and the second local oscillator waveguide 1314 directs the second local oscillator beam toward a second set of dual-balanced photodetectors 1316a, 1316b.

Incoming or reflected light beam 104 enters the photonic chip 1300 at a second aperture 1306. The second aperture 1206 can include an edge coupler such as a grating or a spot size converter (not shown). The reflected light beam 104 is split at directional coupler/splitter or MMI coupler/splitter 1318 into a first portion of the reflected light beam propagating through a first receiver waveguide 1320 and a second portion of the reflected light beam propagating through a second receiver waveguide 1322. In various embodiments, the first portion of the reflected light beam and the second portion of the reflected light beam have the same intensity due to a 50/50 split of the reflected light beam 104 at the directional coupler/splitter or MMI coupler/splitter 1318.

The first receiver waveguide 1320 directs the first portion of the reflected light beam 104 from the second aperture 1306 towards the first set of dual-balanced photodetector 216a, 216b. The first receiver waveguide 1320 is optically coupled to the first local oscillator waveguide 1312 at first combiner 1324. The first local oscillator beam and the first portion of the reflected light beam interact with each other at the combiner 1324 before being received at the first set of dual-balanced photodetector 216a, 216b.

Similarly, the second receiver waveguide 1322 directs the second portion of the reflected light beam 104 from the second aperture 1306 towards the second set of dual-balanced photodetectors 1316a, 1316b. The second receiver waveguide 1322 is optically coupled to the second local oscillator waveguide 1314 at second combiner 1326. The second local oscillator beam and the second portion of the reflected light beam interact with each other at the second combiner 1326 before being received at the second set of dual-balanced photodetector 1316a, 1316b.

The first local oscillator waveguide 1312 includes an optical frequency shifter 1330 located between directional coupler/splitter or MMI coupler/splitter 1310 and first combiner 1324. The optical frequency shifter 1330 shifts the frequency of the first local oscillator beam using the methods disclosed herein. The first local oscillator beam is then combined with the first reflected beam signal at the first combiner 1324. The result of the combination provides a first measurement of a parameter of the object that a reduced level of Doppler ambiguity in the signal.

The second local oscillator beam combines with the second portion of the reflected light beam 104 without an optical frequency shifting. (The second portion of the reflected light beam is an unshifted local oscillator beam). Therefore, the combination of the second local oscillator beam and the second reflected beam signal at the second set of photodetectors 1316a, 1316b provides a second measurement of the parameter of the object. A processor, such as processor 106 of FIG. 1, can compared the first measurement of the parameter of the object and the second measurement of the parameter of the object in order to resolve or remove a Doppler ambiguity in the parameter.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of detecting an object, comprising:
generating, at a laser of a photonic chip, a transmitted light beam and an associated local oscillator beam;
shifting a frequency of the associated local oscillator beam using a frequency shifter of the photonic chip to obtain a frequency-shifted local oscillator beam;
combining, at a combiner of the photonic chip, a reflected light beam with the frequency-shifted local oscillator beam, the reflected light beam being a reflection of the transmitted light beam from the object; and
obtaining a first measurement of a parameter of the object from the combination of the reflected light beam and the frequency-shifted local oscillator beam at a first set of photodetectors.

2. The method of claim 1, further comprising generating the transmitted light beam and the associated local oscillator beam from a chirp signal.

3. The method of claim 2, further comprising shifting the frequency of the associated local oscillator beam by shifting a phase of the chirp signal in a local oscillator waveguide of the photonic chip by a selected amount.

4. The method of claim 1, further comprising transmitting the transmitted light beam from the photonic chip at a first aperture and receiving the reflected light beam at the photonic chip at a second aperture.

5. The method of claim 1, further comprising combining the reflected light beam with an unshifted local oscillator beam and obtaining a second measurement of the parameter of the object from the combination of the reflected light beam with the unshifted local oscillator beam at a second set of photodetectors.

6. The method of claim 5, further comprising removing a Doppler ambiguity for the object from a comparison of the first measurement of the parameter of the object and the second measurement of the parameter of the object.

7. The method of claim 1, further comprising navigating a vehicle with respect to the object using at least the first measurement of the parameter of the object.

8. A lidar system, comprising:
a photonic chip comprising:
- a laser configured to generate a transmitted light beam and an associated local oscillator beam within the photonic chip;
- an on-chip frequency shifter configured to shift a frequency of the associated local oscillator beam to obtain a frequency-shifted local oscillator beam;
- a combiner configured to combine a reflected light beam with the frequency-shifted local oscillator beam, wherein the reflected light beam is a reflection of the transmitted light beam from an object; and
- a first set of photodetectors configured to generate a first electronic signal related to the combination of the frequency-shifted local oscillator beam and the reflected light beam; and a processor configured to obtain a first measurement of a parameter from the first electronic signal.

9. The lidar system of claim 8, wherein the laser is controllable to generate a chirp signal for the transmitted light beam and the associated local oscillator beam.

10. The lidar system of claim 9, wherein the on-chip frequency shifter is configured to shift the frequency of the associated local oscillator beam by shifting a phase of the chirp signal in a local oscillator waveguide by a selected amount.

11. The lidar system of claim 10, further comprising a first aperture of the photonic chip by which the transmitted light beam exits the photonic chip and a second aperture of the photonic chip by which the reflected light beam enters the photonic chip.

12. The lidar system of claim 8, wherein the photonic chip further comprises a second set of photodetectors configured to generate a second electronic signal related to a combination of the reflected light beam with an unshifted local oscillator beam.

13. The lidar system of claim 12, wherein the processor is further configured to remove a Doppler ambiguity for the object from a comparison of the first electronic signal and the second electronic signal.

14. The lidar system of claim 8, further comprising a navigation system configured to navigate a vehicle with respect to the object using at least the first measurement of the parameter of the object.

15. A vehicle, comprising:
a photonic chip comprising:
- a laser configured to generate a transmitted light beam and an associated local oscillator beam within the photonic chip;
- an on-chip frequency shifter configured to shift a frequency of the associated local oscillator beam to obtain a frequency-shifted local oscillator beam;
- a combiner configured to combine a reflected light beam with the frequency-shifted local oscillator beam, wherein the reflected light beam is a reflection of the transmitted light beam from an object; and
- a first set of photodetectors configured to generate a first electronic signal related to the combination of the frequency-shifted local oscillator beam and the reflected light beam;

a processor configured to obtain a first measurement of a parameter from the first electronic signal; and a navigation system configured to navigate the vehicle with respect to the object using at least the first measurement of the parameter of the object.

16. The vehicle of claim 15, wherein the laser is controllable to generate a chirp signal for the transmitted light beam and the associated local oscillator beam.

17. The vehicle of claim 16, wherein the on-chip frequency shifter is configured to shift the frequency of the associated local oscillator beam by shifting a phase of the chirp signal in a local oscillator waveguide by a selected amount.

18. The vehicle of claim 17, further comprising a first aperture of the photonic chip by which the transmitted light beam exits the photonic chip and a second aperture of the photonic chip by which the reflected light beam enters the photonic chip.

19. The vehicle of claim 15, wherein the photonic chip further comprises a second set of photodetectors configured to generate a second electronic signal related to a combination of the reflected light beam with an unshifted local oscillator beam.

20. The vehicle of claim 19, wherein the processor is further configured to remove a Doppler ambiguity for the object from a comparison of the first electronic signal and the second electronic signal.

* * * * *